I. B. GOLDEN.
SALT RISING DOUGH RAISER.
APPLICATION FILED OCT. 9, 1912.
1,051,951.
Patented Feb. 4, 1913.
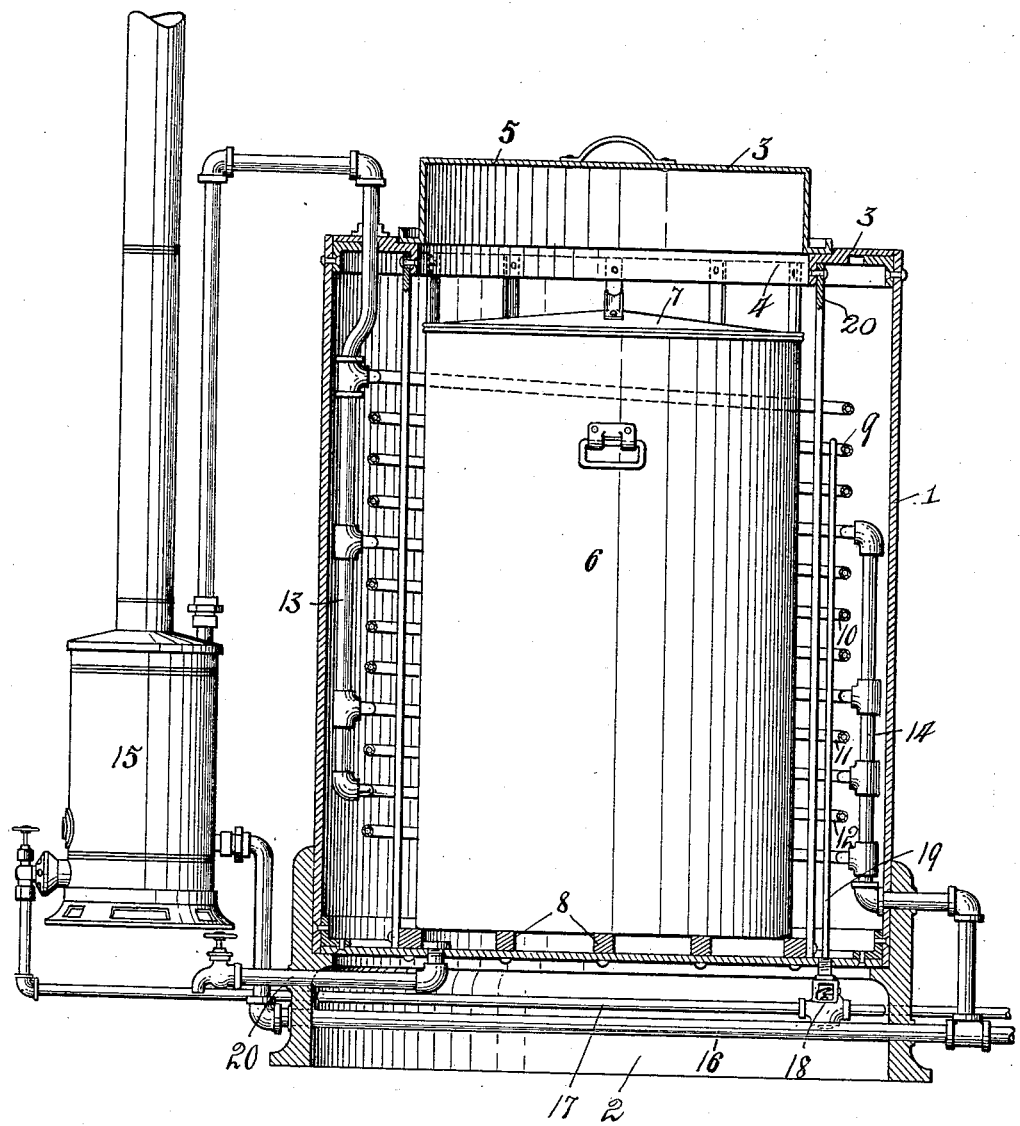

UNITED STATES PATENT OFFICE.

IRVING B. GOLDEN, OF TOLEDO, OHIO.

SALT-RISING-DOUGH RAISER.

1,051,951. Specification of Letters Patent. Patented Feb. 4, 1913.

Application filed October 9, 1912. Serial No. 724,700.

*To all whom it may concern:*

Be it known that I, IRVING B. GOLDEN, a citizen of the United States, and a resident of Toledo, in the county of Lucas and State of Ohio, have invented a certain new and useful Salt-Rising-Dough Raiser; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to dough raising means for use in connection with the manufacture of salt-rising bread, and has for its object to produce a dough of this character which has been accurate and uniform in fermentation and developed to the proper texture and condition whereby any quantity of bread of uniform quality, flavor, appearance and size may be produced.

It is a well known fact that salt-rising bread is very difficult to make and to secure uniform results for different batches, although the same process is followed for each batch. The most important stage in the making of salt-rising breads is the dough raising or fermentation stage, and it is found to be absolutely necessary to the production of uniform batches to subject the doughs to uniform raising conditions.

The invention is fully described in the following specification, and while in its broader aspect, it is capable of embodiment in numerous forms, a preferred embodiment thereof is illustrated in the accompanying drawing, which is an elevation of a plant embodying the same, with a part in central vertical section.

Referring to the drawings, I designates a tank or cylindrical liquid receptacle, which has its bottom closed and supported by a base member 2, or in any other suitable manner. The top 3 of the tank is provided with a large centrally disposed opening 4, which, when the apparatus is in use, is intended to be closed by a cover 5.

A dough container 6, having a removable lid 7, is disposed within the tank 1, being inserted therein and removed therefrom through the opening 4, and is preferably of the same cross-sectional shape but smaller than such tank to provide an annular space between the two. The container 6 rests upon cross-cleats or ribs 8 on the tank bottom to permit water within the tank to have direct contact with both the side and bottom walls thereof.

For the purpose of uniformly heating water within the tank 1, a superimposed series of pipe coil sets, for the passage of a heating fluid therethrough, are disposed within the annular space between the side walls of the tank and container, around the latter. The coil sets, which, in the present instance, are four in number and designated 9, 10, 11 and 12, are each connected at one end to a supply pipe or manifold 13 and at the other end to a common take-off or outlet pipe or manifold 14.

The pipes 13 and 14 are preferably disposed in vertical relation at opposite sides of the container, with the former extending from a heater 15 and down through the top portion of the tank, and with the latter extending down through the lower portion of the tank and connected to the return or ingoing pipe 16 of the heater, which pipe may also have valve controlled connection (not shown) with a source of water supply. The heater 15, which is preferably of the gas type, may be of any suitable construction, a number of different styles of such heaters being on the market. The gas supply pipe 17 of the heater is preferably extended under or adjacent to the lower portion of the tank 1.

The purpose of providing the different sets of heating coils 9, 10, 11 and 12 is to maintain the water in the tank at an even temperature for its entire depth so that all portions of the dough within the container 6 will be caused to uniformly ferment. It is preferable to reduce the number of coils in the lower sets to compensate for the cooling of the heating fluid in the supply pipe 13 due to the downward extension of the same within the tank liquid.

For the purpose of maintaining the heating fluid at a uniform temperature a thermostat regulated valve 18 is disposed in the gas pipe 17 with the thermostat attachment 19 thereof extended up into the tank 1 without the space occupied by the container. Numerous forms of such valve controlling thermostats are on the market.

The container 6 is prevented from having contact with the heating coils by vertical guide bars 20, a plurality of which are disposed in spaced relation between the coils and the container, being attached at their upper ends to the top 3 adjacent to its opening 4 and at their lower ends to the tank bottom.

20 designates a drainage pipe for the tank.

In the use of my improved dough raising apparatus, water within the tank 1 is heated to the desired temperature and the container 6 with the dough therein is then placed within the tank with the water rising therearound to near its top or above the dough line therein. The cover 5 is then placed over the tank opening 4 to maintain a humid atmosphere within the tank, which assists in the dough fermenting process. The sets of heating coils in connection with the thermostat controlled gas heater maintain the water within the tank at a uniform temperature throughout the depth thereof, thus maintaining the dough at uniform temperature during the fermentation stage and producing a raised dough from which bread of even and uniform texture, appearance, shape and size can be produced.

I wish it understood that my invention is not limited to any specific construction or arrangement of the parts except in so far as such limitations are specified in the claims.

Having thus described my invention, what I claim as new, and desire to secure by Letters Patent, is,—

1. In a dough-raiser, the combination of a closed tank, a dough container mounted in said tank in spaced relation to its side walls, a plurality of sets of superimposed pipe coils encircling said container, inlet and outlet manifolds each having separate connection with the respective coils, a gas fluid heater in series with said manifolds, and thermostatic means having a part within the tank and operable to regulate the gas heater to maintain water at a uniform temperature within the tank.

2. In a dough-raiser, the combination of a tank having an opening in its top, a cover for said opening, a dough container in said tank and removable through said opening, a plurality of sets of pipe coils encircling said container within the tank, a supply manifold in separate connection with each of said coils, an outlet manifold in separate connection with each of said coils, a gas water heater in series with said manifolds, a gas supply conduit for said heater, a valve in said conduit, thermostatic means operable by temperature within the tank to control said valve whereby water within the tank is maintained at an even predetermined temperature, and means for preventing the dough container from having contact with said coils.

In testimony whereof, I have hereunto signed my name to this specification in the presence of two subscribing witnesses.

IRVING B. GOLDEN.

Witnesses:
C. W. OWEN,
S. T. KLOTZ.

---

Copies of this patent may be obtained for five cents each, by addressing the "Commissioner of Patents, Washington, D. C."